United States Patent
Mori

[15] 3,663,095
[45] May 16, 1972

[54] RETROFOCUS TYPE SUPER-WIDE ANGLE OBJECTIVE LENS

[72] Inventor: Ikuo Mori, Tokyo, Japan
[73] Assignee: Nippon Kogaku K.K., Tokyo, Japan
[22] Filed: Aug. 26, 1970
[21] Appl. No.: 67,042

[30] Foreign Application Priority Data
June 5, 1970    Japan.................................45/47925

[52] U.S. Cl. ............................................350/214, 350/176
[51] Int. Cl. ..................................................................G02b
[58] Field of Search ............................................350/214, 176

[56] References Cited

UNITED STATES PATENTS 3,524,697   8/1970   Isshiki et al. .......................350/216 X
3,545,845   12/1970   Takahashi............................350/214

Primary Examiner—John K. Corbin
Attorney—Harry G. Shapiro

[57] ABSTRACT

A retrofocus type super-wide angle objective lens system usable with a single-lens reflex camera includes a divergent group forming the forward part of the lens system, a quasi-symmetric group disposed behind the divergent group having a diaphragm disposed intermediately thereof, and a convergent group forming the rearward part of the lens system. The satisfactory correction is made both of the negative distortional aberration inherent to the retrofocus type lens and the curvature of meridional plane resulting from the correction of said negative distortional aberration, thereby providing an angle of field ranging from 100° to 110° and a relative aperture of F/5.6 or higher brightness.

7 Claims, 33 Drawing Figures

PATENTED MAY 16 1972

INVENTOR.
IKUO MORI
BY
Harry I. Shapiro
ATTORNEY (ABERRATION CORVES FOR f=15.4)
FIG. 3a
SPHERICAL ABERRATION SINE CONDITION
FIG. 3b
ASTIGMATISM
FIG. 3c
DISTORTIONAL ABERRATION
FIG. 3d
ASTIGMATISM FOR $\beta = 1/30$
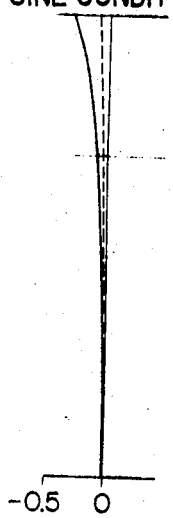
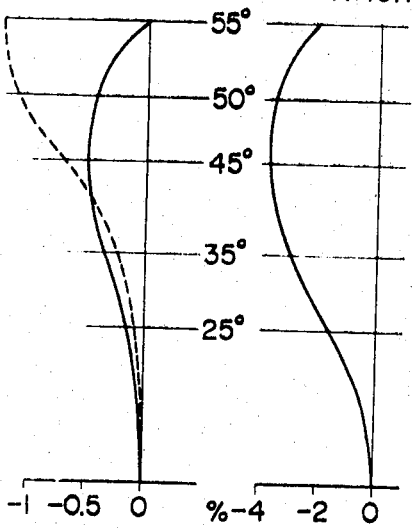
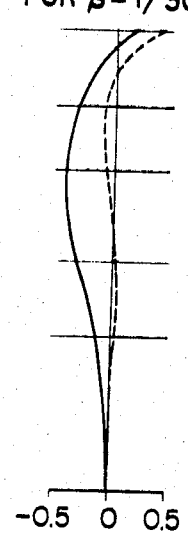
FIG. 3e
COMA
——— LATERAL SPHERICAL ABERRATION
— — — COMA FOR 35°
------ COMA FOR 55°
INVENTOR
IKUO MORI
BY Harry G. Shapiro
ATTORNEY

SPHERICAL ABERRATION

ASTIGMATISM

DISTORTIONAL ABERRATION

INVENTOR.
IKUO MORI
BY Harry G. Shapiro
ATTORNEY

—— LATERAL SPHERICAL ABERRATION
— — — COMA FOR 35°
- - - - - COMA FOR 55°

SPHERICAL ABERRATION SINE CONDITION

ASTIGMATISM

DISTORTIONAL ABERRATION

COMA

——— LATERAL SPHERICAL ABERRATION
――― COMA FOR 35°
------ COMA FOR 53°

INVENTOR
IKUO MORI (ABERRATION CORVES FOR f=18.4)
FIG. 10a
SPHERICAL ABERRATION SINE CONDITION
FIG. 10b
ASTIGMATISM
FIG. 10c
DISTORTIONAL ABERRATION
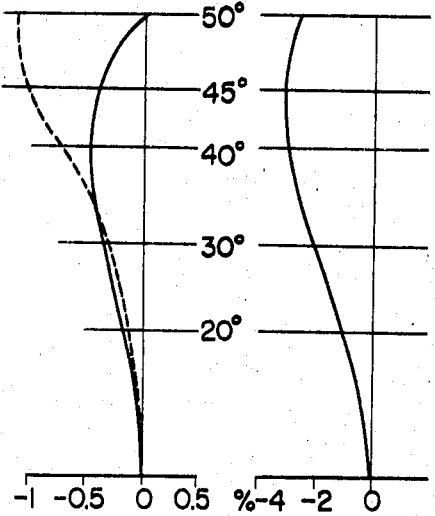
FIG. 10d
ASTIGMATISM FOR $\beta = 1/30$
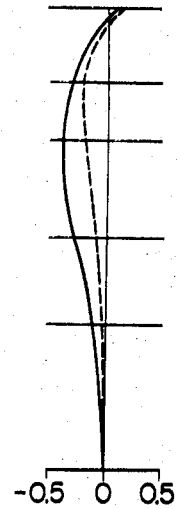
FIG. 10e
COMA
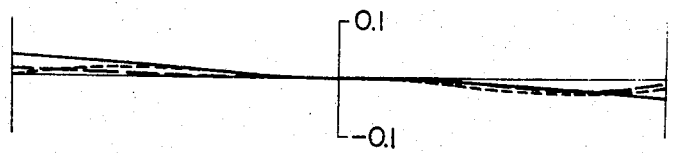
——— LATERAL SPHERICAL ABERRATION
— — — COMA FOR 30°
- - - - - - COMA FOR 50°

SPHERICAL ABERRATION SINE CONDITION

ASTIGMATISM

DISTORTIONAL ABERRATION

COMA

——— LATERAL SPHERICAL ABERRATION
——— COMA FOR 30°
------ COMA FOR 50°

INVENTOR.
IKUO MORI
BY
Harry E. Shapiro
ATTORNEY

RETROFOCUS TYPE SUPER-WIDE ANGLE OBJECTIVE LENS

BACKGROUND OF THE INVENTION

1. Field of the Invention

This invention relates to a retrofocus type super-wide angle objective lens having an angle of field ranging from 100° to 110°, and more particularly to a retrofocus type objective lens having a long back focus (hereinafter simply referred to as B.f.) which is usable with a single-lens reflex camera.

2. Description of the Prior Art

In the retrofocus type lens system, the arrangement of the lens group forming the forward part of the lens system makes a critical factor in providing a super-wide angle of field. Especially, the foremost lens of the group decisively governs the performance of the entire lens system.

For example, if a positive lens is used as the foremost lens, an oblique light beam incident on the positive lens will of course leave it at an angle of exit greater than the angle of incidence and this will increase the aberration of the oblique light beam or the curvature of meridional plane. Such aberration tends to result in an over-correction in the peripheral region of the image field while it tends to cause an under-correction in the vicinity of 80 percent of the image field. This is because in the retrofocus type lens system a light beam having a greater angle of incidence is incident at a remoter point from the optical axis so that it is subjected to a greater refraction provided by the peripheral region of the positive lens. If a negative lens is used as the foremost lens, the curvature of meridional plane in the peripheral region of the image field will be reduced while the negative distortional aberration will be increased. For example, the so-called fish-eye lens which is typical of the super-wide angle lens has an angle of field as great as approximately 180°, but this lens by its very nature requires no correction of the distortional aberration and the curvature of meridional plane is small over the entire image field. However, in the super-wide angle lens as an ordinary photographic objective lens, the distortional aberration must also be corrected and this involves the requirement that a positive lens for correcting the negative distortional aberration be added to the lens system, especially to the divergent group forming the forward part thereof. The tendency to aberration as seen in the described lens system whose foremost lens is a positive lens is also the case with the lens system whose foremost divergent group includes a positive lens, and therefore it is impossible to provide a good meridional plane by the technique of simply adding a positive lens. Especially, in order to obtain a super-wide angle of field, the refractive power of the divergent group must be considerably great and this in turn requires the positive lens added thereto to have a great refractive power. Thus, a good meridional plane becomes more and more difficult to obtain.

The described technique of the prior art encounters another problem. In order to increase B.f. in the retrofocus type lens system, it is usually the practice to increase the refractive power of the divergent group forming the forward part of the lens system. However, a simply increased refractive power may result in an increased negative distortional aberration as described above and this gives rise to the need to correct such distortional aberration as well as to correct the curvature of meridional plane resulting from the correction of that distortional aberration. Thus, it becomes difficult to simply utilize the aforesaid known technique.

Further, a retrofocus type lens, especially a lens system having a long B.f., tends to produce comas of different natures in the peripheral and intermediate regions of the image field. This will be attributable to the fact that the peripheral region of the image field is intensely affected by the meridional plane while the intermediate region is intensely affected by the sine condition. Moreover, if it is desired to have a greater quantity of light reach the peripheral region of the image field, the beam of incident light having a great angle of skew will grow thicker, and when it is refracted in the peripheral region of the divergent group, the inner ray in the beam of light leaving at a relatively small angle of exit and the outer ray leaving at a greater angle of exit are asymmetrical about the main ray, thereby deteriorating the coma.

SUMMARY OF THE INVENTION

It is a first object of the present invention to provide a retrofocus type super-wide angle objective lens in which good correction is made both of the negative distortional aberration inherent to the retrofocus type lens system and the curvature of meridional plane resulting from the correction of said negative distortional aberration and which has an angle of field in the range of 100° to 110° and a relative aperture of F/5.6 or higher brightness.

It is a second object of the present invention to provide an objective lens whose B.f. is about 2 to 2.5 times as great as its focal length.

It is a third object of the present invention to provide an objective lens which can have a greater quantity of light in the peripheral region of the image field and whose coma is satisfactorily corrected over the entire image field.

These objects and other features of the present invention will become more apparent from the following illustrative description taken in conjunction with the accompanying drawings.

BRIEF DESCRIPTION OF THE DRAWINGS

FIGS. 3(a), (b), (c), (d), and (e); illustrate the various aberration curves for $f = 15.4$ in Example I of the present invention, (a) showing the spherical aberration and sine condition, (b) the astigmatism, (c) the distortional aberration, (d) the astigmatism for $\beta = 1/30$, and (e) the coma.

FIGS. 10(a), (b), (c), (d) and (e) illustrate the various aberration curves for $f = 18.4$ in Example IV, (a) showing the spherical aberration and sine condition, (b) the astigmatism, (c) the distortional aberration, (d) the astigmatism for $\beta = 1/30$, and (e) the coma.

DESCRIPTION OF THE PREFERRED EMBODIMENTS

Description will now be made of various examples of the present invention and throughout the description use will be made of the following symbols.

$f$: focal length of the entire lens system.

$R$: radius of curvature of each lens surface or cemented lens surface.

$d$: center thickness of each lens and air spacing between adjacent lenses.

$n$ : refractive index of each lens for helium $d$ spectro-ray.

$\nu d$ : dispersive power of each lens for helium $d$ spectro-ray.

Various suffix numbers added to these symbols represent the order of arrangement as viewed in the direction of incidence, which arrangement takes place in accordance with the natures represented by the respective symbols.

Figure 1:
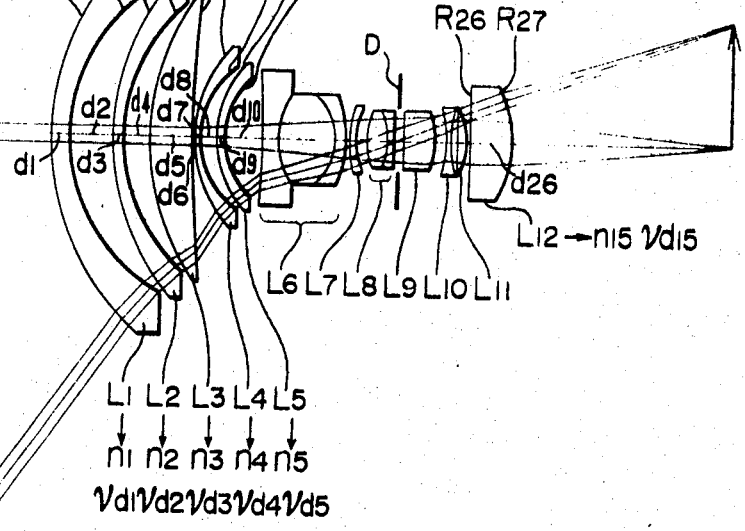
FIG. 1 is a longitudinal sectional view of the lens system according to Example I of the present invention.
Figure 2:
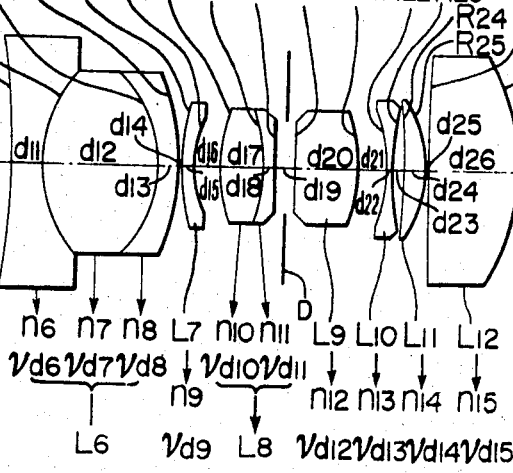
FIG. 2 is an enlarged sectional view showing the rearward portion of the lens system shown in FIG. 1.

Referring first to FIGS. 1 to 3, an objective lens system according to Example I of the present invention is shown which has a field angle of 110° and a relative aperture of F/5. This lens system includes a first and a second component $L_1$ and $L_2$, each of which comprises a negative single meniscus lens having the convex surface thereof for direction toward the object. These first and second components are followed by a third component $L_3$ comprising a positive single meniscus lens whose convex surface also is for the direction toward the object, a fourth and a fifth component $L_4$ and $L_5$ each comprising a negative single meniscus lens whose convex surface also is for direction toward the object, and a sixth component $L_6$ comprising a positive cemented meniscus lens assembly which consists of three lenses, i.e. a biconcave lens, a biconvex lens and a negative meniscus lens having the concave surface thereof for direction toward the object, these three lenses being cemented together. The positive cemented meniscus lens assembly as a whole has a forward-looking concave surface. Behind the sixth component $L_6$ is disposed a seventh component $L_7$ comprising a negative single meniscus lens whose convex surface is for direction toward the object. An eighth component $L_8$ follows which comprises a positive cemented lens assembly consisting of a biconvex lens and a negative lens joined together. The positive cemented lens assembly as a whole has the convex surface thereof facing forward, and it is followed by a diaphragm D, which in turn is followed by a ninth component $L_9$ comprising a positive single lens having the convex surface thereof looking rearward or toward the image plane. Behind the ninth component $L_9$, there is disposed a 10th component $L_{10}$ comprising a single biconcave lens, which is followed by an 11th component $L_{11}$ comprising a positive single meniscus lens having a forward-looking concave surface. A 12th component $L_{12}$ comprising a positive single lens having a rearward-looking convex surface terminates the lens system.

Functionally, the components $L_1$ to $L_6$ constitute a divergent group, the components $L_7$ to $L_{11}$ a quasi-symmetric group relative to the diaphragm D, and the last component $L_{12}$ a convergent group.

$R_1$ and $R_2$ of the first component $L_1$ and $R_3$ and $R_4$ of the second component $L_2$ are in the relations as shown below:

$$1.3<(R_2/f)<2.5, \quad 1.2R_2<R_1<2R_2 \qquad (I)$$
$$1.3<(R_4/f)<2.5, \quad 1.2R_4<R_3<2R_4 \qquad (II)$$

These two conditions are meant to prevent to some degree the deterioration of the meridional plane which would result from the refraction provided by the positive lenses included in the divergent group.

In order to provide a super-wide angle of field, it is unavoidable that the refractive power of the divergent group must be considerably great as described above, whereas the negative distortional aberration resulting from such dispersion must in turn be minimized. For this purpose, according to the present invention, the first half of the divergent group is separated into two negative components $L_1$ and $L_2$, whose respective forward-looking convex surfaces $R_1$ and $R_3$ are increased in curvature so that an incident light beam having a great angle of skew on the respective components $L_1$ and $L_2$ are formed in such a manner that the curvature difference is as small as possible between the surfaces of incidence and exit. This helps to reduce the negative distortional aberration produced in each of these components, which in turn permits the positive component $L_3$ to correct such negative distortional aberration to a relatively small refractive power, thus preventing the deterioration of the meridional plane to some degree.

$R_7$ and $R_8$ of the fourth component $L_4$ and $R_9$ and $R_{10}$ of the fifth component $L_5$ are in the following relations:

$$0.7<(R_8/f)<1.2, \quad 1.2R_8<R_7<2R_8 \qquad (III)$$
$$0.7<(R_{10}/f)<1.2, \quad 1.2R_{10}<R_9<2R_{10} \qquad (IV)$$

These two conditions are meant to separate the latter half of the divergent group into two negative components $L_4$, $L_5$ so as to further improve the curvature of meridional plane and distortional aberration which have already been corrected to some degree by the previously shown conditions (I) and (II).

The significance of the conditions (III) and (IV) is entirely the same as that of the conditions (I) and (II). It will be noted that the numerical values in the conditions (III) and (IV) are reduced to about one half of those in the conditions (I) and (II), and this is because the incident light beam is refracted to be close to the optical axis by the third component $L_3$ interposed between the first and latter halves of the divergent group, whereby the radii of curvature of the fourth and fifth components $L_4$ and $L_5$ necessarily become smaller than those of the first half of the divergent group.

In this way, the negative refractive power is reduced and divisionally allotted and moreover, there is added a positive component having a relatively small refractive power, so that the incident light beam as a whole cannot be subjected to a great positive refractive power. As a result, it is possible to decrease the curvature of meridional plane.

If among the conditions (I) to (IV) the inequalities related to the curvature difference (those given on the right-hand side of the conditions) are not satisfied, it will be apparent that the negative refractive power will become greater to thereby increase the negative distortional aberration, and this in turn would require that the refractive power of the positive component be increased in order to compensate for the increased negative distortional aberration. Such a vicious circle would make it impossible to provide the good results as described above. If the inequalities related to the inner sides of the meniscus lenses are not satisfied, a predetermined B.f. as a retrofocus type lens system could not be obtained.

In order to obtain a great B.f., the sixth component $L_6$ is constituted by a cemented lens assembly, and the relation between the refractive indices $n_6$ and $n_7$ in the regions on the opposite sides of the cemented forward surface $R_{12}$ of that lens and the relation between the center thicknesses of the respective lenses in this component are set as follows:

$$n_6 > n_7 \qquad (V)$$
$$d_{12} + d_{13} > d_{11} \qquad (VI)$$

Further, the relation between $R_{15}$ and $R_{16}$ of the seventh component $L_7$ is set as follows:

$$0.4<(R_{16}/f)<0.7, \quad 2R_{16}<R_{15}<3R_{16} \qquad (VII)$$

Thus, a great B.f. can be obtained.

The conditions (V) and (VI) are intended to maintain a positive refractive power in the sixth component $L_6$ as a whole and at the same time to direct light through the component in the divergent direction so as to enable the light to leave that component at points remote from the optical axis. More specifically, the condition (V) is useful in that light can be directed upwardly to a greater extent without the need to increase the curvature of the cemented surface $R_{12}$, but rather by utilizing the difference in refractive index between the lenses of the component $L_6$ to eliminate the undesirable influence resulting from a great curvature. In addition, the condition (VI) provides a great value of $d_{12} + d_{13}$ so as to provide points of exit remote from the optical axis. This is due to the fact that if the points of incidence are higher than the points of exit, B.f. can be increased as if a divergent component were used.

Further, the condition (VII) is intended partly to compensate for the negative refractive power of the divergent group $L_1$–$L_6$ since the seventh component $L_7$ closely adjacent to the diaphragm D does not significantly harm the distortional aberration even if the negative refractive power of the component $L_7$ is increased. Of course, the condition (VII) is also meant to increase B.f.

The numerical values in the condition (VII) are about half of those for the latter part of the divergent group because the points of incidence are further closer to the optical axis.

The coma in the peripheral region of the image field is improved since the meridional plane is improved by the conditions (I) to (VII), while the coma in the intermediate and other regions tends to take place generally in the positive sense because it is related to the sine condition as mentioned previously. For this reason, the center thickness $d_{26}$ of the rearmost twelfth component $L_{12}$ is made extremely great as shown below:

$$0.4f < d_{26} < 0.7f \quad \text{(VIII)}$$

Thereby the sine condition is improved.

Thus, the coma can be corrected satisfactorily over the entire image field, but care should be taken in selecting the value of the center thickness $d_{26}$ because too great a value for the center thickness $d_{26}$ causes the distortional aberration to displace in the negative sense.

In this way, with the improvement of the coma, the quantity of incident light can be greatly increased, amounting to, say, 190 percent of the aperture as measured in a first tangential plane, and 20.6 percent as measured by cos 4 theory.

Also, the extremely wide angle of field tends to result in an over-correction of the sagittal plane in the peripheral region of the image field. Therefore, in the quasi-symmetric group, the following conditions are set up to improve the sagittal plane.

$$d_{17} + d_{18} > d_{19} < d_{20} \quad \text{(IX)}$$
$$d_{22} + d_{23} + d_{24} < d_{26} \quad \text{(X)}$$

For the correction of the out-axial chromatic aberration, the dispersive powers on the opposite sides of the rearward cemented surface $R_{13}$ of the sixth component $L_6$ are set thus:

$$vd_7 < vd_8,$$

and the similar factors on the opposite sides of the cemented surface $R_{18}$ of the eighth component $L_8$ are set thus:

$$vd_{10} < vd_{11}.$$

Thus, good correction of such chromatic aberration can be achieved.

The data of Example I will now be shown.

EXAMPLE I (FIGS. 1–3)

| | | | |
|---|---|---|---|
| $f = 15.4$ | B.f. = 38.06 | F/5 | Angle of field: 110° |
| $R_1 = 46.0$ | | | |
| | $d_1 = 3.1$ | $n_1 = 1.732$ | $vd_1 = 53.2$ |
| $R_2 = 30.9$ | | | |
| | $d_2 = 7.4$ | | |
| $R_3 = 43.6$ | | | |
| | $d_3 = 2.0$ | $n_2 = 1.732$ | $vd_2 = 53.2$ |
| $R_4 = 30.6$ | | | |
| | $d_4 = 4.8$ | | |
| $R_5 = 45.6$ | | | |
| | $d_5 = 7.6$ | $n_3 = 1.7$ | $vd_3 = 47.9$ |
| $R_6 = 310.5$ | | | |
| | $d_6 = 0.1$ | | |
| $R_7 = 24.2$ | | | |
| | $d_7 = 1.0$ | $n_4 = 1.8411$ | $vd_4 = 43.3$ |
| $R_8 = 14.9$ | | | |
| | $d_8 = 3.0$ | | |
| $R_9 = 20.9$ | | | |
| | $d_9 = 1.0$ | $n_5 = 1.8411$ | $vd_5 = 43.3$ |
| $R_{10} = 13.9$ | | | |
| | $d_{10} = 6.6$ | | |
| $R_{11} = -255.0$ | | | |
| | $d_{11} = 2.8$ | $n_6 = 1.8411$ | $vd_6 = 43.3$ |
| $R_{12} = 12.2$ | | | |
| | $d_{12} = 10.0$ | $n_7 = 1.54072$ | $vd_7 = 47.2$ |
| $R_{13} = -10.8$ | | | |
| | $d_{13} = 2.0$ | $n_8 = 1.53996$ | $vd_8 = 59.7$ |
| $R_{14} = -18.9$ | | | |
| | $d_{14} = 0.2$ | | |
| $R_{15} = 20.0$ | | | |
| | $d_{15} = 1.0$ | $n_9 = 1.6968$ | $vd_9 = 55.6$ |
| $R_{16} = 8.5$ | | | |
| | $d_{16} = 2.3$ | | |
| $R_{17} = 12.8$ | | | |
| | $d_{17} = 3.8$ | $n_{10} = 1.58065$ | $vd_{10} = 37.1$ |
| $R_{18} = -14.0$ | | | |
| | $d_{18} = 1.0$ | $n_{11} = 1.58313$ | $vd_{11} = 59.3$ |
| $R_{19} = \infty$ | | | |
| | $d_{19} = 1.7$ | | |
| $R_{20} = \infty$ | | | |
| | $d_{20} = 5.62$ | $n_{12} = 1.58065$ | $vd_{12} = 37.1$ |
| $R_{21} = -12.1$ | | | |
| | $d_{21} = 2.3$ | | |
| $R_{22} = -13.8$ | | | |
| | $d_{22} = 0.65$ | $n_{13} = 1.86074$ | $vd_{13} = 23.1$ |
| $R_{23} = 34.3$ | | | |
| | $d_{23} = 0.65$ | | |
| $R_{24} = -77.0$ | | | |
| | $d_{24} = 2.0$ | $n_{14} = 1.44628$ | $vd_{14} = 67.2$ |
| $R_{25} = -10.8$ | | | |
| | $d_{25} = 0.1$ | | |
| $R_{26} = 466.0$ | | | |
| | $d_{26} = 7.6$ | $n_{15} = 1.52$ | $vd_{15} = 70.1$ |
| $R_{27} = -19.679$ | | | |

SEIDEL ABERRATION COEFFICIENTS IN EXAMPLE I

| Lens surface order No. | Spherical aberration | Coma | Curvature of tangential image | Curvature of sagittal image | Distortional aberration |
|---|---|---|---|---|---|
| | I | II | III | IV | V |
| 1 | 0.009 | 0.009 | 0.167 | 0.150 | 0.146 |
| 2 | −0.065 | 0.010 | −0.216 | 0.212 | 0.034 |
| 3 | 0.037 | 0.024 | 0.197 | 0.165 | 0.109 |
| 4 | −0.144 | −0.003 | −0.213 | −0.213 | −0.004 |
| 5 | 0.084 | 0.045 | 0.212 | 0.163 | 0.087 |
| 6 | 0.000 | −0.001 | −0.052 | −0.031 | −0.529 |
| 7 | 0.083 | +0.048 | 0.374 | 0.318 | 0.184 |
| 8 | −1.080 | 0.104 | −0.502 | −0.483 | 0.046 |
| 9 | 0.665 | 0.115 | 0.396 | 0.356 | 0.062 |
| 10 | −3.092 | 0.287 | −0.587 | −0.533 | 0.050 |
| 11 | 0.222 | 0.204 | 0.539 | 0.161 | 0.149 |
| 12 | −8.299 | 0.658 | −0.290 | −0.186 | 0.015 |
| 13 | 0.007 | −0.002 | 0.002 | −0.001 | 0.000 |
| 14 | 0.724 | −0.309 | 0.680 | 0.417 | −0.178 |
| 15 | 5.431 | 0.848 | 0.713 | 0.448 | 0.070 |
| 16 | −144.916 | −2.066 | −0.832 | −0.774 | −0.011 |
| 17 | 95.385 | 4.675 | 1.129 | 0.671 | 0.033 |
| 18 | −0.090 | 0.010 | −0.005 | −0.002 | 0.003 |
| 19 | −0.015 | −0.028 | −0.161 | −0.054 | −0.102 |
| 20 | 0.015 | 0.028 | 0.162 | 0.054 | 0.102 |
| 21 | 98.553 | −3.203 | 0.780 | 0.571 | −0.019 |
| 22 | −68.738 | 2.043 | −0.698 | −0.577 | 0.017 |
| 23 | −16.792 | −4.430 | −3.714 | −1.377 | −0.363 |
| 24 | 1.331 | 0.724 | 1.121 | 0.332 | 0.181 |
| 25 | 21.626 | −0.237 | 0.448 | 0.442 | −0.005 |
| 26 | 0.002 | 0.006 | 0.071 | 0.031 | 0.100 |
| 27 | 21.331 | 0.470 | 0.299 | 0.278 | 0.006 |
| Σ | 2.274 | 0.029 | 0.020 | 0.114 | 0.183 |

Figure 4:
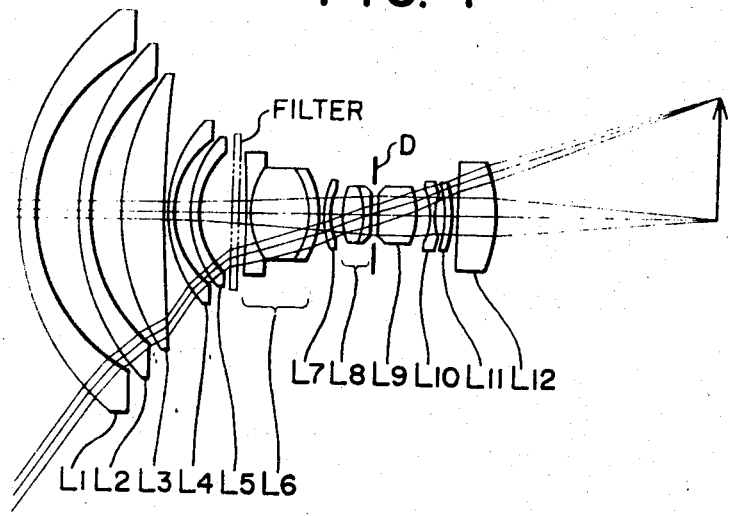
FIG. 4 is a longitudinal sectional view of the lens system according to Example II of the present invention.
Figure 5A:
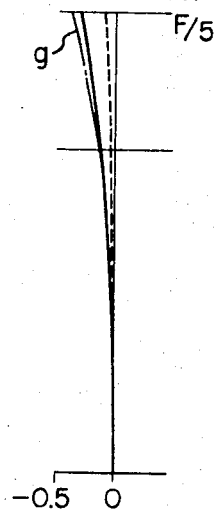
FIGS. 5(a), (b), (c) and (d) illustrate the various aberration curves for $f = 15.4$ in Example II, (a) showing the spherical aberration and sine condition, (b) the astigmatism, (c) the distortional aberration and (d) the coma.
Figure 5B:
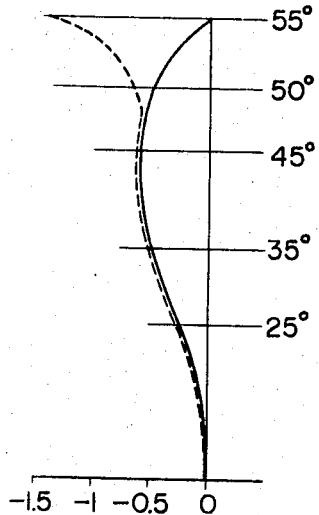
Figure 5C:
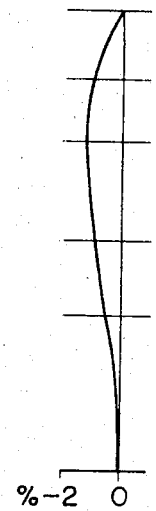
Figure 5D:
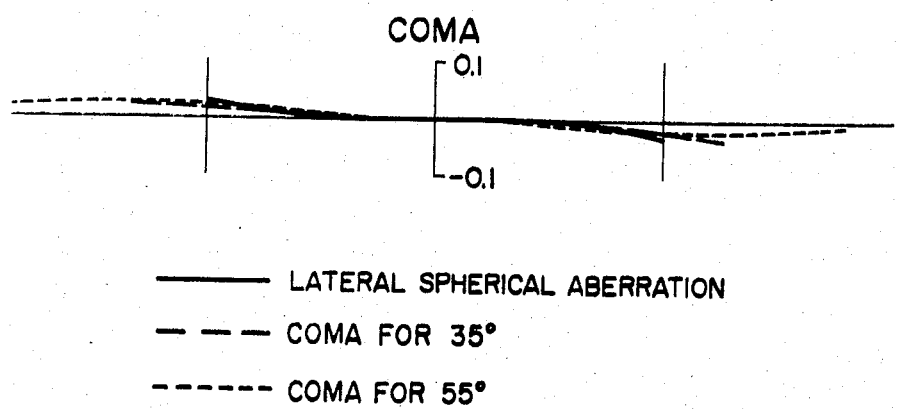

FIGS. 4 and 5 show Example II of the present invention. In this Example, the distortional aberration present in the foregoing Example I, especially that which is likely to remain in the intermediate region of the image field, is corrected to a further degree. The convex surface $R_1$ of the first component $L_1$ is provided by a non-spherical surface of the revolution-symmetric type.

EXAMPLE II (FIGS 4–5)

| | | | |
|---|---|---|---|
| $f = 15.4$ | B.f. = 38.04 | F/5.6 | Angle of field: 110° |
| $R_1$: revolution-symmetric non-spherical surface. | | | |
| $R_0, R_0', d_0, d_0', n_0$: filters. | | | |
| $R_1 = 48.0$ | | | |
| | $d_1 = 3.1$ | $n_1 = 1.732$ | $vd_1 = 53.2$ |
| $R_2 = 30.9$ | | | |
| | $d_2 = 7.4$ | | |
| $R_3 = 43.6$ | | | |
| | $d_3 = 2.0$ | $n_2 = 1.732$ | $vd_2 = 53.2$ |
| $R_4 = 30.6$ | | | |
| | $d_4 = 4.8$ | | |
| $R_5 = 45.6$ | | | |
| | $d_5 = 7.6$ | $n_3 = 1.7$ | $vd_3 = 47.9$ |
| $R_6 = 310.5$ | | | |
| | $d_6 = 0.1$ | | |
| $R_7 = 24.2$ | | | |
| | $d_7 = 1.0$ | $n_4 = 1.8411$ | $vd_4 = 43.3$ |
| $R_8 = 14.9$ | | | |
| | $d_8 = 3.0$ | | |
| $R_9 = 20.9$ | | | |
| | $d_9 = 1.0$ | $n_5 = 1.8411$ | $vd_5 = 43.3$ |
| $R_{10} = 13.9$ | | | |
| | $d_{10} = 5.6$ | | |
| $R_0 = \infty$ | | | |
| | $d_0 = 1.2$ | $n_0 = 1.51743$ | |
| $R_0' \leq \infty$ | | | |
| | $d_0' \leq 1.0$ | | |
| $R_{11} = -255.0$ | | | |
| | $d_{11} = 1.1$ | $n_6 = 1.8411$ | $vd_6 = 43.3$ |
| $R_{12} = 12.65$ | | | |
| | $d_{12} = 10.0$ | $n_7 = 1.54072$ | $vd_7 = 47.2$ |
| $R_{13} = -10.8$ | | | |
| | $d_{13} = 2.0$ | $n_8 = 1.53996$ | $vd_8 = 59.7$ |

| | | | |
|---|---|---|---|
| $R_{14} = -18.8$ | | | |
| | $d_{14} = 0.2$ | | |
| $R_{15} = 20.0$ | | | |
| | $d_{15} = 1.0$ | $n_9 = 1.6968$ | $\nu d_9 = 55.6$ |
| $R_{16} = 8.5$ | | | |
| | $d_{16} = 2.3$ | | |
| $R_{17} = 12.75$ | | | |
| | $d_{17} = 3.8$ | $n_{10} = 1.58065$ | $\nu d_{10} = 37.1$ |
| $R_{18} = -14.0$ | | | |
| | $d_{18} = 1.05$ | $n_{11} = 1.58313$ | $\nu d_{11} = 59.3$ |
| $R_{19} = \infty$ | | | |
| | $d_{19} = 1.2$ | | |
| $R_{20} = \infty$ | | | |
| | $d_{20} = 6.4$ | $n_{12} = 1.58065$ | $\nu d_{12} = 37.1$ |
| $R_{21} = -12.12$ | | | |
| | $d_{21} = 2.2$ | | |
| $R_{22} = -13.9$ | | | |
| | $d_{22} = 1.1$ | $n_{13} = 1.86074$ | $\nu d_{13} = 23.1$ |
| $R_{23} = 34.65$ | | | |
| | $d_{23} = 0.7$ | | |
| $R_{24} = -75.0$ | | | |
| | $d_{24} = 2.2$ | $n_{14} = 1.44628$ | $\nu d_{14} = 67.2$ |
| $R_{25} = -10.75$ | | | |
| | $d_{25} = 0.1$ | | |
| $R_{26} = 466.0$ | | | |
| | $d_{26} = 7.0$ | $n_{15} = 1.52$ | $\nu d_{15} = 70.0$ |
| $R_{27} = -20.584$ | | | |

The following shows the configuration of the non-spherical surface, in which the effective radius of $R_1$ is 33.5.

$R_1$ = Amount of deviation Z from the spherical surface of 46.0.

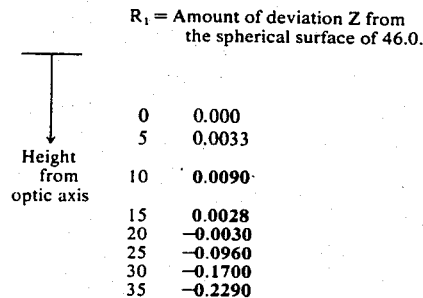

| Height from optic axis | |
|---|---|
| 0 | 0.000 |
| 5 | 0.0033 |
| 10 | 0.0090 |
| 15 | 0.0028 |
| 20 | −0.0030 |
| 25 | −0.0960 |
| 30 | −0.1700 |
| 35 | −0.2290 |

Figure 6:
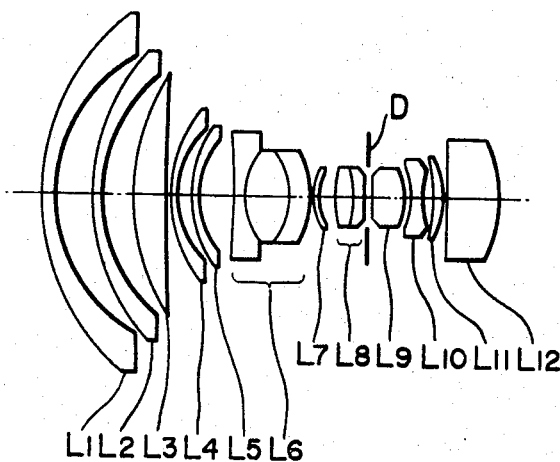
FIG. 6 is a longitudinal sectional view of the lens system according to Example III of the present invention.
Figure 7A:
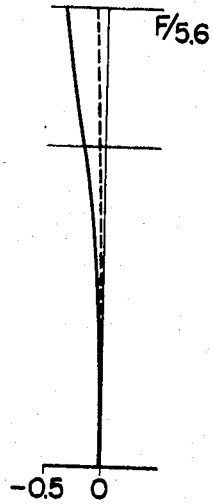
FIGS. 7(a), (b), (c) and (d) illustrate the various aberration curves for $f = 16.4$ in Example III, (a) showing the spherical aberration and sine condition, (b) the astigmatism, (c) the distortional aberration and (d) the coma.
Figure 7B:
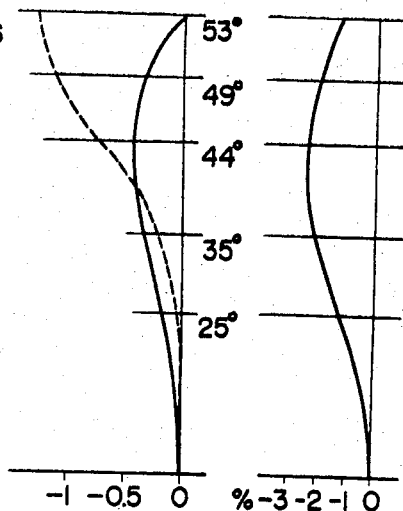
Figure 7C:
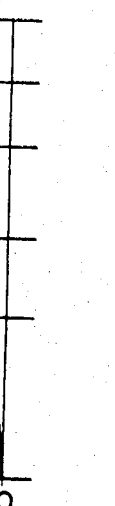
Figure 7D:
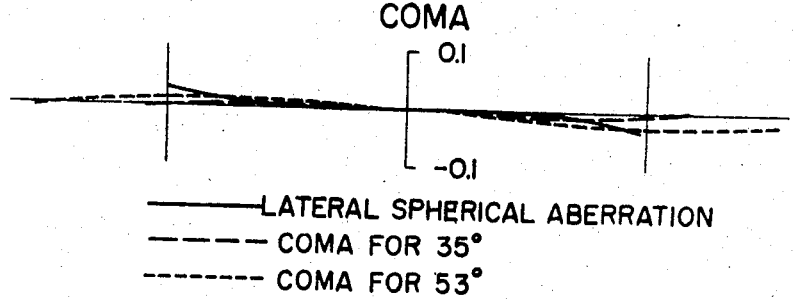
Figure 8:
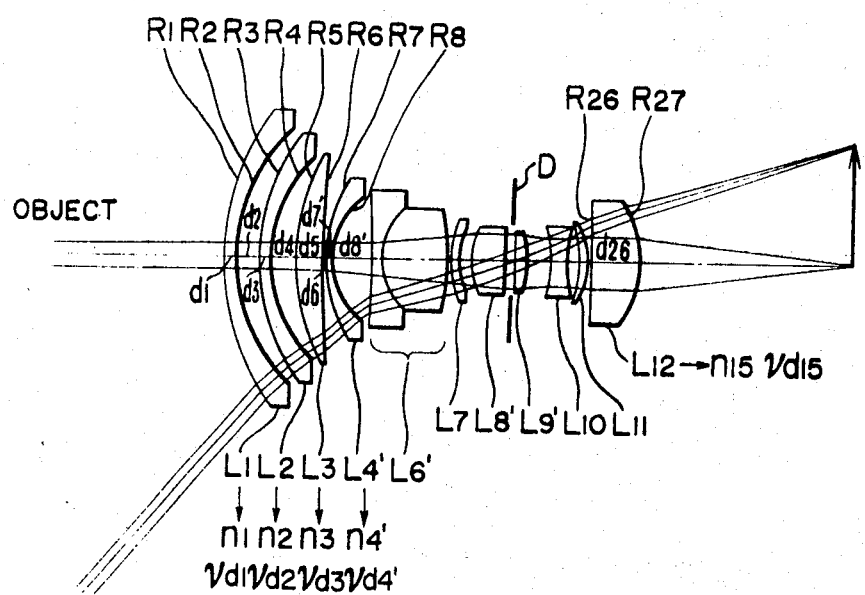
FIG. 8 shows, in longitudinal cross section, the lens system according to Example IV of the present invention.
Figure 9:
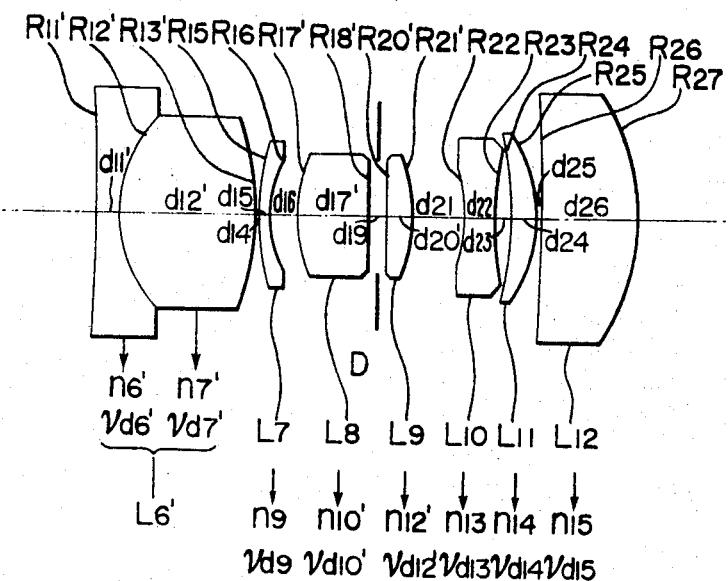
FIG. 9 is an enlarged sectional view showing the rearward portion of the lens system shown in FIG. 8.
Figure 11:
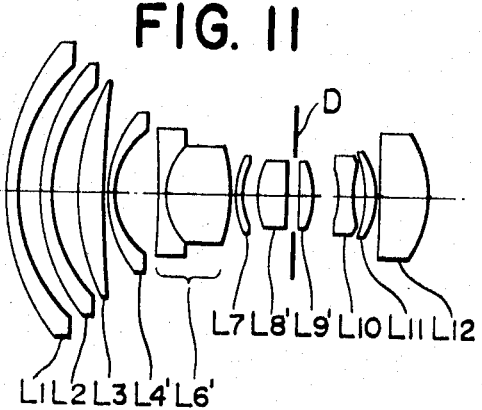
FIG. 11 is a longitudinal sectional view of the lens system according to Example V of the present invention.
Figure 12A:
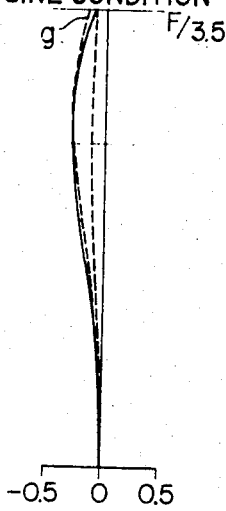
FIGS. 12(a), (b), (c) and (d) illustrate the various aberration curves for $f = 18.4$ in Example V, (a) showing the spherical aberration and sine condition, (b) the astigmatism, (c) the distortional aberration and (d) the coma.
Figure 12B:
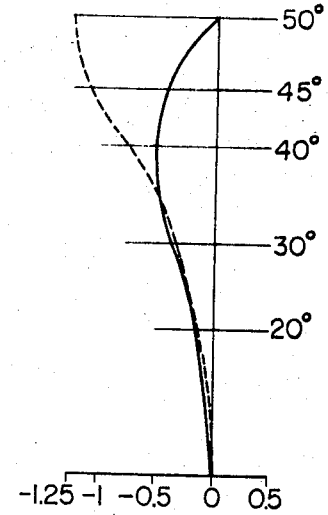
Figure 12C:
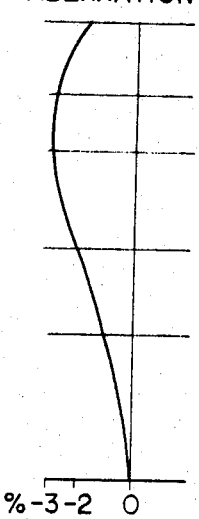
Figure 12D:
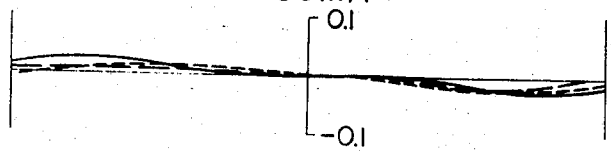

FIGS. 6 and 7 show Example III of the present invention, in which the distortional aberration present in Example I is corrected to a further degree without using the non-spherical surface. The angle of field is slightly reduced to 106°.

EXAMPLE III (FIGS. 6–7)

| | | | |
|---|---|---|---|
| $f = 16.4$ | B.f. = 41.3 | F/5.6 Angle of field: 106° | |
| $R_1 = 39.7$ | | | |
| | $d_1 = 2.65$ | $n_1 = 1.732$ | $\nu d_1 = 53.2$ |
| $R_2 = 26.8$ | | | |
| | $d_2 = 6.6$ | | |
| $R_3 = 37.1$ | | | |
| | $d_3 = 2.3$ | $n_2 = 1.732$ | $\nu d_2 = 53.2$ |
| $R_4 = 25.9$ | | | |
| | $d_4 = 41.9$ | | |
| | $d_5 = 6.3$ | $n_3 = 1.732$ | $\nu d_3 = 53.2$ |
| $R_6 = 409.0$ | | | |
| | $d_6 = 0.1$ | | |
| $R_7 = 24.45$ | | | |
| | $d_7 = 1.05$ | $n_4 = 1.8411$ | $\nu d_4 = 43.3$ |
| $R_8 = 15.05$ | | | |
| | $d_8 = 2.6$ | | |
| $R_9 = 21.3$ | | | |
| | $d_9 = 1.4$ | $n_5 = 1.8411$ | $\nu d_5 = 43.3$ |
| $R_{10} = 14.1$ | | | |
| | $d_{10} = 6.0$ | | |
| $R_{11} = -170.0$ | | | |
| | $d_{11} = 2.0$ | $n_6 = 1.8411$ | $\nu d_6 = 43.3$ |
| $R_{12} = 13.1$ | | | |
| | $d_{12} = 11.0$ | $n_7 = 1.58065$ | $\nu d_7 = 37.1$ |
| $R_{13} = -13.7$ | | | |
| | $d_{13} = 1.0$ | $n_8 = 1.58313$ | $\nu d_8 = 59.3$ |
| $R_{14} = -19.22$ | | | |
| | $d_{14} = 0.1$ | | |
| $R_{15} = 22.1$ | | | |
| | $d_{15} = 0.6$ | $n_9 = 1.6969$ | $\nu d_9 = 55.6$ |
| $R_{16} = 9.45$ | | | |
| | $d_{16} = 2.55$ | | |
| $R_{17} = 13.95$ | | | |
| | $d_{17} = 4.1$ | $n_{10} = 1.58065$ | $\nu d_{10} = 37.1$ |
| $R_{18} = -22.0$ | | | |

| | | | |
|---|---|---|---|
| $R_{19} = 1470.0$ | $d_{18} = 1.0$ | $n_{11} = 1.58313$ | $\nu d_{11} = 59.3$ |
| | $d_{19} = 1.4$ | | |
| $R_{20} = -7355.0$ | | | |
| | $d_{20} = 5.9$ | $n_{12} = 1.58065$ | $\nu d_{12} = 37.1$ |
| $R_{21} = -12.4$ | | | |
| | $d_{21} = 0.6$ | | |
| $R_{22} = -13.6$ | | | |
| | $d_{22} = 3.0$ | $n_{13} = 1.86074$ | $\nu d_{13} = 23.1$ |
| $R_{23} = 41.4$ | | | |
| | $d_{23} = 0.7$ | | |
| $R_{24} = -60.0$ | | | |
| | $d_{24} = 2.5$ | $n_{14} = 1.51118$ | $\nu d_{14} = 50.9$ |
| $R_{25} = -11.1$ | | | |
| | $d_{25} = 0.1$ | | |
| $R_{26} = 1160.0$ | | | |
| | $d_{26} = 9.5$ | $n_{15} = 1.52$ | $\nu d_{15} = 70.0$ |
| $R_{27} = -24.75$ | | | |

In Examples IV and V as shown in FIGS. 8 to 12, the number of lenses in use is reduced for economy of manufacture. Both of these examples have a high performance such as 100° angle of field and a relative aperture in the range of F/3.5 to F/4. As compared with Examples I to III shown in FIGS. 1 to 7, these alternative examples reduce the number of lenses in the latter half of the divergent group and in the quasi-symmetric group.

More specifically, in Examples IV and V, the latter half of the divergent group is composed of two components, i.e. a fourth component $L_6'$ comprising a negative single meniscus lens having a forward-looking convex surface, and a sixth component $L_6'$ comprising a composite lens formed by a biconcave lens and a biconvex lens cemented together, the composite lens as a whole having the concave surface thereof for direction toward the object.

The divergent groups of Examples IV and V differ from those of Examples I to III in that the fifth component $L_5$ is eliminated and that the rearward meniscus lens is eliminated in the sixth component $L_6$.

The quasi-symmetric group in Examples IV and V is constituted by an eighth component $L_8'$ and a ninth component $L_9'$ with a diaphragm D interposed therebetween, the component $L_8'$ comprising a positive single lens having a forward-looking convex surface and the component $L_9'$ comprising a positive single lens having a rearward-looking convex surface.

As compared with Examples I to III, the quasi-symmetric group in either of Examples IV and V differs in that the rearward negative lens is omitted in the eighth component $L_8$.

In such a lens system, a long B.f. can hardly be obtained simply by replacing the fourth and fifth components $L_4$ and $L_5$ of Examples I to III with a single component. Therefore, $R_7'$ and $R_8'$ of the component $L_4'$ are set to satisfy the following relations:

$$0.6 < (R_8'/f) < 0.8, \quad 1.5R_8' < R_7' < 2.5R_8'$$

Thus, the negative refractive power is increased, and the fact that the angle of field smaller than that in Examples I to III results in a smaller out-axial chromatic aberration permits the omission of the achromatic cemented surfaces of the sixth and eighth components $L_6$ and $L_8$ used in Examples I to III.

Here are the detailed data of Examples IV and V.

EXAMPLE IV (FIGS. 8–10)

| | | | |
|---|---|---|---|
| $f = 18.4$ | B.f. = 37.52 | F/4 Angle of field: 100° | |
| $R_1 = 42.0$ | | | |
| | $d_1 = 2.0$ | $n_1 = 1.6968$ | $\nu d_1 = 55.6$ |
| $R_2 = 27.9$ | | | |
| | $d_2 = 4.5$ | | |
| $R_3 = 37.8$ | | | |
| | $d_3 = 1.8$ | $n_2 = 1.6968$ | $\nu d_2 = 55.6$ |
| $R_4 = 25.5$ | | | |
| | $d_4 = 4.5$ | | |
| $R_5 = 40.0$ | | | |
| | $d_5 = 5.0$ | $n_3 = 1.62041$ | $\nu d_3 = 60.3$ |
| $R_6 = 250.0$ | | | |
| | $d_6 = 0.1$ | | |
| $R_7' = 24.6$ | | | |
| | $d_7' = 1.0$ | $n_4' = 1.6968$ | $\nu d_4' = 55.6$ |
| $R_8' = 12.4$ | | | |
| | $d_8' = 7.0$ | | |

$R_9$ (omitted)
$d_9$ (omitted)    $n_5$ (omitted)    $\nu d_5$ (omitted)
$R_{10}$ (omitted)
             $d_{10}$ (omitted)
$R_{11}' = -200.0$
             $d_{11}' = 2.0$    $n_6' = 1.77279$    $\nu d_6' = 49.5$
$R_{12}' = 12.3$
             $d_{12}' = 12.0$   $n_7' = 1.589$      $\nu d_7' = 48.6$
$R_{13}' = -28.0$
             $d_{13}$ (omitted)
$R_{14}$ (omitted)
             $d_{14} = 0.1$     $n_8$ (omitted)     $\nu d_8$ (omitted)
$R_{15} = 23.8$
             $d_{15} = 1.0$     $n_9 = 1.67025$     $\nu d_9 = 57.5$
$R_{16} = 10.1$
             $d_{16} = 2.6$
$R_{17}' = 16.3$
             $d_{17}' = 5.95$   $n_{10}' = 1.58065$ $\nu d_{10}' = 37.1$
$R_{18}' = \infty$
             $d_{18}$ (omitted)
$R_{19}$ (omitted)
             $d_{19} = 1.5$     $n_{11}$ (omitted)  $\nu d_{11}$ (omitted)
$R_{20}' = \infty$
             $d_{20}' = 2.0$    $n_{12}' = 1.58065$ $\nu d_{12}' = 37.1$
$R_{21}' = -14.3$
             $d_{21} = 4.6$
$R_{22} = -14.6$
             $d_{22} = 3.1$     $n_{13} = 1.86074$  $\nu d_{13} = 23.1$
$R_{23} = 50.7$
             $d_{23} = 0.9$
$R_{24} = -38.5$
             $d_{24} = 2.5$     $n_{14} = 1.51823$  $\nu d_{14} = 59.0$
$R_{25} = -11.8$
             $d_{25} = 0.1$
$R_{26} = -550$
             $d_{26} = 8.5$     $n_{15} = 1.55671$  $\nu d_{15} = 58.5$
$R_{27} = -19.337$

SEIDEL ABERRATION COEFFICIENTS IN EXAMPLE IV

| Lens surface order No. | Spherical aberration Coma | | Curvature of tangential image | Curvature of sagittal image | Distortional aberration |
|---|---|---|---|---|---|
| | I | II | III | IV | V |
| 1 | 0.020 | 0.018 | 0.229 | 0.196 | 0.177 |
| 2 | −0.155 | 0.004 | −0.271 | −0.271 | 0.007 |
| 3 | 0.089 | 0.042 | 0.259 | 0.219 | 0.103 |
| 4 | −0.400 | 0.018 | −0.299 | −0.297 | 0.014 |
| 5 | 0.213 | 0.078 | 0.263 | 0.205 | 0.075 |
| 6 | −0.001 | −0.006 | −0.139 | −0.065 | −0.436 |
| 7' | 0.178 | 0.079 | 0.414 | 0.342 | 0.153 |
| 8' | −3.780 | 0.660 | −0.955 | −0.725 | 0.127 |
| 9 | (omitted) | | | | |
| 10 | (omitted) | | | | |
| 11' | 0.102 | 0.137 | 0.513 | 0.144 | 0.194 |
| 12' | −4.585 | 0.530 | −0.282 | −0.159 | 0.018 |
| 13' | 0.055 | −0.047 | 0.361 | 0.283 | −0.238 |
| 14 | (omitted) | | | | |
| 15 | 2.883 | 0.619 | 0.709 | 0.443 | 0.095 |
| 16 | −68.879 | −1.036 | −0.778 | −0.747 | −0.011 |
| 17' | 40.836 | 2.856 | 1.014 | 0.614 | 0.043 |
| 18' | −0.029 | −0.050 | −0.253 | −0.084 | −0.144 |
| 19 | (omitted) | | | | |
| 20' | +0.029 | 0.050 | 0.256 | 0.085 | 0.146 |
| 21' | 42.921 | −4.353 | 1.797 | 0.914 | −0.093 |
| 22 | −30.000 | 2.199 | −1.067 | −0.744 | 0.055 |
| 23 | −6.425 | −2.685 | −3.533 | −1.290 | −0.539 |
| 24 | 0.091 | 0.166 | 0.745 | 0.140 | 0.255 |
| 25 | 13.209 | −0.011 | 0.532 | 0.532 | 0.000 |
| 26 | 0.000 | 0.000 | 0.002 | −0.007 | 0.145 |
| 27 | 18.215 | 1.202 | 0.579 | 0.420 | 0.028 |
| Σ | 4.587 | 0.471 | 0.096 | 0.148 | 0.174 |

EXAMPLE V (FIGS. 11-12)

$f = 18.4$    B.f. = 37.54    F/3.5    Angle of field: 100°
$R_1 = 42.0$
             $d_1 = 2.0$       $n_1 = 1.6935$      $\nu d_1 = 50.6$
$R_2 = 28.0$
             $d_2 = 3.8$
$R_3 = 37.8$
             $d_3 = 1.8$       $n_2 = 1.6968$      $\nu d_2 = 55.6$
$R_4 = 25.5$
             $d_4 = 4.5$
$R_5 = 40.0$
             $d_5 = 5.0$       $n_3 = 1.62041$     $\nu d_3 = 57.5$
$R_6 = 280.0$
             $d_6 = 0.1$
$R_7' = 24.6$
             $d_7' = 1$        $n_4' = 1.6968$     $\nu d_4' = 55.6$
$R_8' = 12.4$
             $d_8' = 7$
$R_9$ (omitted)
             $d_9$ (omitted)   $n_5$ (omitted)     $\nu d_5$ (omitted)
$R_{10}$ (omitted)
             $d_{10}$ (omitted)
$R_{11}' = -200.0$
             $d_{11}' = 2$     $n_6' = 1.77279$    $\nu d_6' = 49.5$
$R_{12}' = 12.6$
             $d_{12}' = 12.0$  $n_7' = 1.58267$    $\nu d_7' = 46.5$
$R_{13}' = -27.8$
             $d_{13}'$ (omitted)
$R_{14}$ (omitted)
             $d_{14} = 0.1$    $n_8$ (omitted)     $\nu d_8$ (omitted)
$R_{15} = 23.8$
             $d_{15} = 1.0$    $n_9 = 1.67025$     $\nu d_9 = 57.5$
$R_{16} = 10.1$
             $d_{16} = 2.55$
$R_{17}' = 16.3$
             $d_{17}' = 5.7$   $n_{10}' = 1.58065$ $\nu d_{10}' = 37.1$
$R_{18}' = \infty$
             $d_{18}$ (omitted)
$R_{19}$ (omitted)
             $d_{19} = 1.5$    $n_{11}$ (omitted)  $\nu d_{11}$ (omitted)
$R_{20'} = \infty$
             $d_{20'} = 2.45$  $n_{12'} = 1.58065$ $\nu d_{12'} = 37.1$
$R_{21'} = -14.3$
             $d_{21'} = 4.4$
$R_{22} = -14.6$
             $d_{22} = 3.2$    $n_{13} = 1.86074$  $\nu d_{13} = 23.1$
$R_{23} = 51.4$
             $d_{23} = 0.95$
$R_{24} = -38.5$
             $d_{24} = 2.4$    $n_{14} = 1.51823$  $\nu d_{14} = 59.0$
$R_{25} = -11.78$
             $d_{25} = 0.1$
$R_{26} = -550.0$
             $d_{26} = 8.5$    $n_{15} = 1.55671$  $\nu d_{15} = 58.5$
$R_{27} = -19.27$ As described, the present invention provides a retrofocus type super-wide angle objective lens in which aberrations such as astigmatism and coma are corrected satisfactorily over the entire image field in spite of the extremely wide angle of field.

What is claimed is:

1. A retrofocus type lens system comprising the combination of:

i. a divergent group forming the forward part of the lens system and including at least:

a. a first pair of divergent components disposed at the foremost end of the lens system, each of said first pair of divergent components comprising a negative single meniscus lens having the convex surface thereof for direction toward object, b. a first convergent component disposed behind said first pair of divergent components and comprising a single meniscus lens having the convex surface thereof for direction toward object, c. a second pair of divergent components disposed behind said first convergent component, each of said second pair of divergent components comprising a negative single meniscus lens having the convex surface thereof for direction toward the object, and d. a second convergent component disposed behind said second pair of divergent components and comprising a cemented lens assembly consisting of a biconcave lens, a biconvex lens and a negative meniscus lens disposed in the named order in the rearward direction and joined together, said negative meniscus lens having the concave surface thereof for direction toward object, said cemented lens assembly as a whole having the concave surface thereof for direction toward the object;

ii. a quasi-symmetric group disposed behind said divergent group and having a diaphragm disposed intermediately, said quasi-symmetric group comprising at least:

e. a third divergent component forming the foremost part of said quasi-symmetric group and comprising a single meniscus lens having the convex surface thereof for direction toward object, f. a third convergent component disposed behind said third divergent component and just before said diaphragm, said third convergent component comprising a cemented lens assembly comprising a biconvex lens and a divergent lens disposed in the named order in the rearward direction and joined together, said cemented lens assembly as a whole having the convex surface thereof for direction toward the object, g. a fourth convergent component disposed just behind said diaphragm and comprising a single lens having the convex surface thereof for direction toward the image toward the image in such a manner that said convex surface is substantially symmetrical with said forward-looking convex surface of said third convergent component about said diaphragm, h. a fourth divergent component disposed behind said fourth convergent component and comprising a biconcave lens, and i. a fifth convergent component disposed behind said fourth divergent component and comprising a single meniscus lens having the convex surface thereof looking rearward in such a manner that said convex surface is substantially symmetrical with said forward-looking convex surface of said third divergent component about said diaphragm; and iii. a convergent group forming the rearmost part of the lens system and comprising at least one component consisting of a positive single lens having the convex surface thereof for direction toward the image.

2. A retrofocus type lens system according to claim 1, which has the data as follows:

$f = 15.4$  B.f. $= 38.06$  F/5  Angle of field: $110°$
$R_1 = 46.0$
$R_2 = 30.9$, $d_1 = 3.1$, $n_1 = 1.732$, $vd_1 = 53.2$
$R_3 = 43.6$, $d_2 = 7.4$
$R_4 = 30.6$, $d_3 = 2.0$, $n_2 = 1.732$, $vd_2 = 53.2$
$R_5 = 45.6$, $d_4 = 4.8$
$R_6 = 310.5$, $d_5 = 7.6$, $n_3 = 1.7$, $vd_3 = 47.9$
$R_7 = 24.2$, $d_6 = 0.1$
$R_8 = 14.9$, $d_7 = 1.0$, $n_4 = 1.8411$, $vd_4 = 43.3$
$R_9 = 20.9$, $d_8 = 3.0$
$R_{10} = 13.9$, $d_9 = 1.0$, $n_5 = 1.8411$, $vd_5 = 43.3$
$R_{11} = -255.0$, $d_{10} = 6.6$
$R_{12} = 12.2$, $d_{11} = 2.8$, $n_6 = 1.8411$, $vd_6 = 43.3$
$R_{13} = -10.8$, $d_{12} = 10.0$, $n_7 = 1.54072$, $vd_7 = 47.2$
$R_{14} = -18.9$, $d_{13} = 2.0$, $n_8 = 1.53996$, $vd_8 = 59.7$
$R_{15} = 20.0$, $d_{14} = 0.2$
$R_{16} = 8.5$, $d_{15} = 1.0$, $n_9 = 1.6968$, $vd_9 = 55.6$
$R_{17} = 12.8$, $d_{16} = 2.3$
$R_{18} = -14.0$, $d_{17} = 3.8$, $n_{10} = 1.58065$, $vd_{10} = 37.1$
$R_{19} = \infty$, $d_{18} = 1.0$, $n_{11} = 1.58313$, $vd_{11} = 59.3$
$R_{20} = \infty$, $d_{19} = 1.7$
$R_{21} = -12.1$, $d_{20} = 5.62$, $n_{12} = 1.58065$, $vd_{12} = 37.1$
$R_{22} = -13.8$, $d_{21} = 2.3$
$R_{23} = 34.4$, $d_{22} = 0.65$, $n_{13} = 1.86074$, $vd_{13} = 23.1$
$R_{24} = -77.0$, $d_{23} = 0.65$
$R_{25} = -10.8$, $d_{24} = 2.0$, $n_{14} = 1.44628$, $vd_{14} = 67.2$
$R_{26} = 466.0$, $d_{25} = 0.1$
$R_{27} = -19.679$, $d_{26} = 7.6$, $n_{15} = 1.52$, $vd_{15} = 70.1$ where $f$ denotes the focal length of the entire lens system, R denotes radius of curvature of each lens surface, $d$ denotes center thickness of each lens and air spacing between adjacent lenses, $n$ subscript denotes refractive index of each lens for helium $d$ spectro-ray, and $vd$ denotes dispersive power of each lens for helium $d$ spectro-ray.

3. A retrofocus type lens system according to claim 1, which has the data as follows:

$f = 15.4$  B.f. $= 38.04$  F/5.6  Angle of field: $110°$
$R_1$: revolution-symmetric non-spherical surface.
$R_0, R_0', d_0, d_0', n_0$: filters.
$R_1 = 48.0$
$R_2 = 30.9$, $d_1 = 3.1$, $n_1 = 1.732$, $vd_1 = 53.2$
$R_3 = 43.6$, $d_2 = 7.4$
$R_4 = 30.6$, $d_3 = 2.0$, $n_2 = 1.732$, $vd_2 = 53.2$
$R_5 = 45.6$, $d_4 = 4.8$
$R_6 = 310.5$, $d_5 = 7.6$, $n_3 = 1.7$, $vd_3 = 47.9$
$R_7 = 24.2$, $d_6 = 0.1$
$R_8 = 14.9$, $d_7 = 1.0$, $n_4 = 1.8411$, $vd_4 = 43.3$
$R_9 = 20.9$, $d_8 = 3.0$
$R_{10} = 13.9$, $d_9 = 1.0$, $n_5 = 1.8411$, $vd_5 = 43.3$
$R_0 = \infty$, $d_{10} = 5.6$
$R_0' \leq \infty$, $d_0 = 1.2$, $n_0 = 1.51743$
$R_{11} = -255.0$, $d_0' \leq 1.0$
$R_{12} = 12.65$, $d_{11} = 1.1$, $n_6 = 1.8411$, $vd_6 = 43.3$
$R_{13} = -10.8$, $d_{12} = 10.0$, $n_7 = 1.54072$, $vd_7 = 47.2$
$R_{14} = -18.8$, $d_{13} = 2.0$, $n_8 = 1.53996$, $vd_8 = 59.7$
$R_{15} = 20.0$, $d_{14} = 0.2$
$R_{16} = 8.5$, $d_{15} = 1.0$, $n_9 = 1.6968$, $vd_9 = 55.6$
$R_{17} = 12.75$, $d_{16} = 2.3$
$R_{18} = -14.0$, $d_{17} = 3.8$, $n_{10} = 1.58065$, $vd_{10} = 37.1$
$R_{19} = \infty$, $d_{18} = 1.05$, $n_{11} = 1.58313$, $vd_{11} = 59.3$
$R_{20} = \infty$, $d_{19} = 1.2$
$R_{21} = -12.12$, $d_{20} = 6.4$, $n_{12} = 1.58065$, $vd_{12} = 37.1$
$R_{22} = -13.9$, $d_{21} = 2.2$
$R_{23} = 34.65$, $d_{22} = 1.1$, $n_{13} = 1.86074$, $vd_{13} = 23.1$
$R_{24} = -75.0$, $d_{23} = 0.7$
$R_{25} = -10.75$, $d_{24} = 2.2$, $n_{14} = 1.44628$, $vd_{14} = 67.2$
$R_{26} = 466.0$, $d_{25} = 0.1$
$R_{27} = -20.584$, $d_{26} = 7.0$, $n_{15} = 1.52$, $vd_{15} = 70.0$ where $f$ denotes the focal length of the entire lens system, R denotes radius of curvature of each lens surface, $d$ denotes center thickness of each lens and air spacing between adjacent lenses, $n$ denotes refractive index of each lens for helium $d$ spectro-ray, and $vd$ denotes dispersive power of each lens for helium $d$ spectro-ray.

4. A retrofocus type lens system according to claim 1, which has the data as follows:

$f = 16.4$  B.f. $= 41.3$  F/5.6  Angle of field: $106°$
$R_1 = 39.7$
$R_2 = 26.8$, $d_1 = 2.65$, $n_1 = 1.732$, $vd_1 = 53.2$
$R_3 = 37.1$, $d_2 = 6.6$
$R_4 = 25.9$, $d_3 = 2.3$, $n_2 = 1.732$, $vd_2 = 53.2$
$R_5 = 41.9$, $d_4 = 5.3$

| | | | |
|---|---|---|---|
| $R_6 = 409.0$ | $d_5 = 6.3$ | $n_3 = 1.732$ | $vd_3 = 53.2$ |
| $R_7 = 24.45$ | $d_6 = 0.1$ | | |
| $R_8 = 15.05$ | $d_7 = 1.05$ | $n_4 = 1.8411$ | $vd_4 = 43.3$ |
| $R_9 = 21.3$ | $d_8 = 2.06$ | | |
| $R_{10} = 14.1$ | $d_9 = 1.4$ | $n_5 = 1.8411$ | $vd_5 = 43.3$ |
| $R_{11} = -170.0$ | $d_{10} = 6.0$ | | |
| $R_{12} = -13.7$ | $d_{11} = 11.0$ | $n_7 = 1.58065$ | $vd_7 = 37.2$ |
| $R_{14} = -19.22$ | $d_{13} = 1.0$ | $n_8 = 1.58313$ | $vd_8 = 59.3$ |
| $R_{15} = 22.1$ | $d_{14} = 0.1$ | | |
| $R_{16} = 9.45$ | $d_{15} = 0.6$ | $n_9 = 1.6969$ | $vd_9 = 55.6$ |
| $R_{17} = 13.95$ | $d_{16} = 2.55$ | | |
| $R_{18} = -22.0$ | $d_{17} = 4.1$ | $n_{10} = 1.58065$ | $vd_{10} = 37.1$ |
| $R_{19} = 1470.0$ | $d_{18} = 1.0$ | $n_{11} = 1.58313$ | $vd_{11} = 59.3$ |
| $R_{20} = -7355.0$ | $d_{19} = 1.4$ | | |
| $R_{21} = -12.4$ | $d_{20} = 5.9$ | $n_{12} = 1.58065$ | $vd_{12} = 37.1$ |
| $R_{22} = -13.6$ | $d_{21} = 0.6$ | | |
| $R_{23} = 41.4$ | $d_{22} = 3.0$ | $n_{13} = 1.86074$ | $vd_{13} = 23.1$ |
| $R_{24} = -60.0$ | $d_{23} = 0.7$ | | |
| $R_{25} = -11.1$ | $d_{24} = 2.5$ | $n_{14} = 1.51118$ | $vd_{14} = 50.9$ |
| $R_{26} = 1160.0$ | $d_{25} = 0.1$ | | |
| $R_{27} = -24.75$ | $d_{26} = 9.5$ | $n_{15} = 1.52$ | $vd_{15} = 70.0$ | where $f$ denotes the focal length of the entire lens system, R denotes radius of curvature of each lens surface, $d$ denotes center thickness of each lens and air spacing between adjacent lenses, $n$ denotes refractive index of each lens for helium $d$ spectro-ray, and $vd$ denotes dispersive power of each lens for helium $d$ spectro-ray.

5. A retrofocus type lens system comprising the combination of:
   i. a divergent group forming the forward part of the lens system and including at least:
      a. a first pair of divergent components disposed at the foremost end of the lens system, each of said first pair of divergent components comprising a negative single meniscus lens having the convex surface thereof for direction toward an object,
      b. a first convergent component disposed behind said first pair of divergent components and comprising a single meniscus lens having the convex surface thereof for direction toward the object,
      c. a second divergent component disposed behind said first convergent component and comprising a single meniscus lens having the convex surface thereof for direction toward the object, and
      d. a second convergent component disposed behind said second divergent component and comprising a cemented meniscus lens assembly consisting of a biconcave lens and a biconvex lens disposed in the named order in the rearward direction and joined together, said cemented meniscus lens assembly as a whole having the concave surface thereof for direction toward the object;
   ii. a quasi-symmetric group disposed behind said divergent group and having a diaphragm disposed intermediately, said quasi-symmetric group comprising at least:
      e. a third divergent component forming the foremost part of said quasi-symmetric group and comprising a single meniscus lens having the convex surface thereof for direction toward object,
      f. a third convergent component disposed behind said third divergent component and just before said diaphragm, said third convergent component comprising a single lens having the convex surface thereof for direction toward the object,
      g. a fourth convergent component disposed just behind said diaphragm and comprising a single lens having the convex surface thereof for direction toward the image in such a manner that said convex surface is substantially symmetrical with said forward-looking convex surface of said third convergent component about said diaphragm,
      h. a fourth divergent component disposed behind said fourth convergent component and comprising a biconcave lens, and
      i. a fifth convergent component disposed behind said fourth divergent component and comprising a single meniscus lens having the convex surface thereof for direction toward the image in such a manner that said convex surface is substantially symmetrical with said forward-looking convex surface of said third divergent component about said diaphragm; and
   iii. a convergent group forming the rearmost part of the lens system and comprising at least one component consisting of a positive single lens having the convex surface thereof for direction toward image.

6. A retrofocus type lens system according to claim 5, which has the data as follows:

$f = 18.4$ B.f. $= 37.52$ F/4 Angle of field: 100°

| | | | |
|---|---|---|---|
| $R_1 = 42.0$ | $d_1 = 2.0$ | $n_1 = 1.6968$ | $vd_1 = 55.6$ |
| $R_2 = 27.9$ | $d_2 = 4.5$ | | |
| $R_3 = 37.8$ | $d_3 = 1.8$ | $n_2 = 1.6968$ | $vd_2 = 55.6$ |
| $R_4 = 25.5$ | $d_4 = 4.5$ | | |
| $R_5 = 40.0$ | $d_5 = 5.0$ | $n_3 = 1.62041$ | $vd_3 = 60.3$ |
| $R_6 = 250.0$ | $d_6 = 0.1$ | | |
| $R_7' = 24.6$ | $d_7' = 1.0$ | $n_4' = 1.6968$ | $vd_4' = 55.6$ |
| $R_8' = 12.4$ | $d_8' = 7.0$ | | |
| $R_9$ (omitted) | $d_9$ (omitted) | $n_5$ (omitted) | $vd_5$ (omitted) |
| $R_{10}$ (omitted) | $d_{10}$ (omitted) | | |
| $R_{11}' = -200.0$ | $d_{11}' = 2.0$ | $n_6' = 1.77279$ | $vd_6' = 49.5$ |
| $R_{12}' = 12.3$ | $d_{12}' = 12.0$ | $n_7' = 1.589$ | $vd_7' = 48.6$ |
| $R_{13}' = -28.0$ | $d_{13}$ (omitted) | | |
| $R_{14}$ (omitted) | $d_{14} = 0.1$ | $n_8$ (omitted) | $vd_8$ (omitted) |
| $R_{15} = 23.8$ | $d_{15} = 1.0$ | $n_9 = 1.67025$ | $vd_9 = 57.5$ |
| $R_{16} = 10.1$ | $d_{16} = 2.6$ | | |
| $R_{17}' = 16.3$ | $d_{17}' = 5.95$ | $n_{10}' = 1.58065$ | $vd_{10}' = 37.1$ |
| $R_{18}' = \infty$ | $d_{18}$ (omitted) | | |
| $R_{19}$ (omitted) | $d_{19} = 1.5$ | $n_{11}$ (omitted) | $vd_{11}$ (omitted) |
| $R_{20}' = \infty$ | $d_{20}' = 2.0$ | $n_{12}' = 1.58065$ | $vd_{12}' = 37.1$ |
| $R_{21}' = -14.3$ | $d_{21} = 4.6$ | | |
| $R_{22} = -14.6$ | $d_{22} = 3.2$ | $n_{13} = 1.86074$ | $vd_{13} = 23.1$ |
| $R_{23} = 50.7$ | $d_{23} = 0.9$ | | |
| $R_{24} = -38.5$ | $d_{24} = 2.5$ | $n_{14} = 1.51823$ | $vd_{14} = 59.0$ |
| $R_{25} = 11.8$ | $d_{25} = 0.1$ | | |
| $R_{26} = -550.$ | $d_{26} = 8.5$ | $n_{15} = 1.55661$ | $vd_{15} = 58.5$ |
| $R_{27} = -19.337$ | | | | where $f$ denotes the focal length of the entire lens system, R denotes radius of curvature of each lens surface, $d$ denotes center thickness of each lens and air spacing between adjacent lenses, $n$ denotes refractive index of each lens for helium $d$ spectro-ray, and $\nu d$ denotes dispersive power of each lens for helium $d$ spectro-ray.

7. A retrofocus type lens system according to claim 5, which has the data as follows:

| | | | |
|---|---|---|---|
| $f = 18.4$ | B.f. = 37.54 | F/3.5 | Angle of field: 100° |
| $R_1 = 42.0$ | | | |
| | $d_1 = 2.0$ | $n_1 = 1.6935$ | $\nu d_1 = 50.6$ |
| $R_2 = 28.0$ | $d_2 = 3.8$ | | |
| $R_3 = 37.8$ | $d_3 = 1.8$ | $n_2 = 1.6968$ | $\nu d_2 = 55.6$ |
| $R_4 = 25.5$ | $d_4 = 4.5$ | | |
| $R_5 = 40.0$ | $d_5 = 5.0$ | $n_3 = 1.62041$ | $\nu d_3 = 57.5$ |
| $R_6 = 280.0$ | $d_6 = 0.1$ | | |
| $R_7' = 24.6$ | $d_7' = 1.0$ | $n_4' = 1.6968$ | $\nu d_4' = 55.6$ |
| $R_8' = 12.4$ | $d_8' = 7.0$ | | |
| $R_9$ (omitted) | $d_9$ (omitted) | $n_5$ (omitted) | $\nu d_5$ (omitted) |
| $R_{10}$ (omitted) | $d_{10}$ (omitted) | | |
| $R_{11}' = -200.0$ | $d_{11}' = 2$ | $n_6' = 1.77279$ | $\nu d_6' = 49.5$ |
| $R_{12}' = 12.6$ | $d_{12}' = 12.0$ | $n_7' = 1.58267$ | $\nu d_7' = 46.5$ |
| $R_{13}' = -27.8$ | $d_{13}'$ (omitted) | | |
| $R_{14}$ (omitted) | | | |
| $R_{15} = 23.8$ | $d_{14} = 0.1$ | $n_8$ (omitted) | $\nu d_8$ (omitted) |
| $R_{16} = 10.1$ | $d_{15} = 1.0$ | $n_9 = 1.67025$ | $\nu d_9 = 57.5$ |
| | $d_{16} = 2.55$ | | |
| $R_{17}' = 16.3$ | $d_{17}' = 5.7$ | $n_{10}' = 1.58065$ | $\nu d_{10}' = 37.1$ |
| $R_{18}' = \infty$ | $d_{18}$ (omitted) | | |
| $R_{19}$ (omitted) | $d_{19} = 1.5$ | $n_{11}$ (omitted) | $\nu d_{11}$ (omitted) |
| $R_{20}' = \infty$ | | | |
| $R_{21}' = -14.3$ | $d_{21}' = 4.4$ | | |
| $R_{22} = -14.6$ | $d_{22} = 3.2$ | $n_{13} = 1.86074$ | $\nu d_{13} = 23.1$ |
| $R_{23} = 51.4$ | $d_{23} = 0.95$ | | |
| $R_{24} = -38.5$ | $d_{24} = 2.4$ | $n_{14} = 1.51823$ | $\nu d_{14} = 59.0$ |
| $R_{25} = -11.78$ | $d_{25} = 0.1$ | | |
| $R_{26} = -550.0$ | $d_{26} = 8.5$ | $n_{15} = 1.55671$ | $\nu d_{15} = 58.5$ |
| $R_{27} = -19.27$ | | | | where $f$ denotes the focal length of the entire lens system, R denotes radius of curvature of each lens surface, $d$ denotes center thickness of each lens and air spacing between adjacent lenses, $n$ denotes refractive index of each lens for helium $d$ spectro-ray, and $\nu d$ denotes dispersive power of each lens for helium $d$ spectro-ray.

* * * * *